(12) United States Patent
Gallego et al.

(10) Patent No.: US 10,160,504 B2
(45) Date of Patent: Dec. 25, 2018

(54) LUBRICATING SYSTEM FOR A FIFTH WHEEL TRACTION COUPLING OF A SEMI TRAILER TRACTION ENGINE

(75) Inventors: José Manuel Algüera Gallego, Aschaffenburg (DE); Dirk Schmidt, Königstein (DE)

(73) Assignee: Jost-Werke GmbH, Neu-Isenburg (DE)

( * ) Notice: Subject to any disclaimer, the term of this patent is extended or adjusted under 35 U.S.C. 154(b) by 1364 days.

(21) Appl. No.: 11/884,327

(22) PCT Filed: Feb. 11, 2006

(86) PCT No.: PCT/EP2006/001269
§ 371 (c)(1),
(2), (4) Date: Nov. 14, 2007

(87) PCT Pub. No.: WO2006/084752
PCT Pub. Date: Aug. 17, 2006

(65) Prior Publication Data
US 2008/0185228 A1      Aug. 7, 2008

(30) Foreign Application Priority Data

Feb. 11, 2005   (DE) ........................ 10 2005 007 144

(51) Int. Cl.
*F16N 21/00*      (2006.01)
*B62D 53/08*      (2006.01)

(52) U.S. Cl.
CPC ................ *B62D 53/0885* (2013.01)

(58) Field of Classification Search
CPC .......... F16N 13/22; F16N 21/00; F16N 11/08; B62D 53/0885
(Continued)

(56) References Cited

U.S. PATENT DOCUMENTS 1,365,025 A  *  1/1921  Elder ...................... F16L 15/08
                                                    285/125.1
2,960,352 A  *  11/1960  Wood ........................... 280/433
(Continued)

FOREIGN PATENT DOCUMENTS

DE         32 12 832 A1    10/1983
DE         35 30 467 A1     3/1987
(Continued)

OTHER PUBLICATIONS

Machine Translation of DE 41 10 893 A1 retreived from http://translationportal.epo.org/ on Jun. 2, 2014.*
(Continued)

*Primary Examiner* — Henry Y Liu
(74) *Attorney, Agent, or Firm* — Flaster/Greenberg P.C.

(57) ABSTRACT

The invention concerns a lubricating system for a fifth-wheel traction coupling of a towing vehicle, comprising a coupling plate, the upper side of which has at least one grease discharge aperture which is connected to a lubricating device via a supply line fixed to the coupling plate. The invention addresses the problem of developing a lubricating system for towing vehicles which permits automatic lubrication irrespective of whether a central lubricating system is provided. The invention solves the problem using a lubricating system in which the lubricating device is associated with the fifth-wheel traction coupling and is arranged directly on the fifth-wheel traction coupling or in the vicinity of the fifth-wheel traction coupling.

23 Claims, 3 Drawing Sheets

Figure 1:
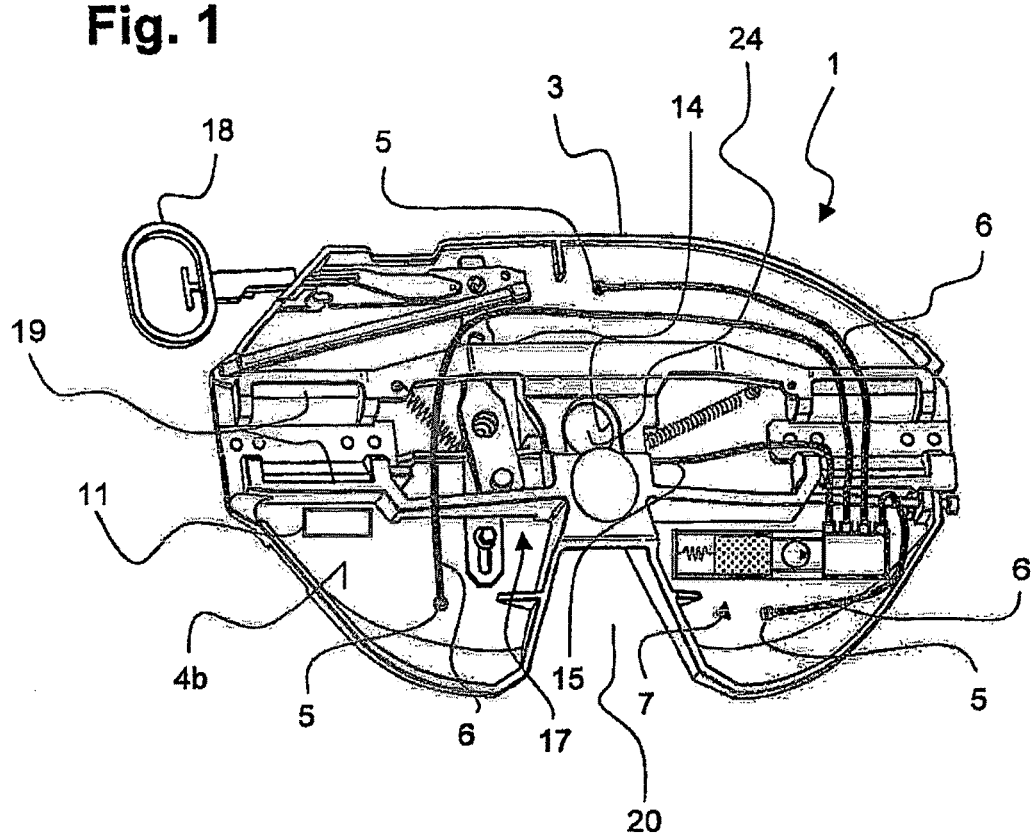

(58) Field of Classification Search
USPC .............. 184/6.19, 26, 74, 5; 280/433–441.1
See application file for complete search history.

(56) References Cited

U.S. PATENT DOCUMENTS

| | | | | |
|---|---|---|---|---|
| 4,011,927 | A * | 3/1977 | Smith | .............................. 184/26 |
| 4,477,100 | A | 10/1984 | Elyakim | |
| 5,219,040 | A | 6/1993 | Meuer et al. | |
| 5,402,913 | A * | 4/1995 | Graf | ........................ F16N 13/06 184/15.2 |
| 5,417,308 | A * | 5/1995 | Hartl | .............................. 184/6.4 |
| 5,968,325 | A | 10/1999 | Oloman et al. | |
| 6,008,724 | A * | 12/1999 | Thompson | .................... 340/438 |
| 6,012,551 | A * | 1/2000 | Raab | .............................. 184/7.4 |
| 6,098,754 | A | 8/2000 | Toner | |
| 6,408,985 | B1 * | 6/2002 | Orlitzky | .................. F16N 11/08 184/105.2 |
| 6,802,394 | B2 * | 10/2004 | Patterson | ................ F16N 11/04 184/105.1 |
| 6,874,599 | B1 * | 4/2005 | Riskedal | .................... 184/105.3 |
| 7,178,634 | B2 * | 2/2007 | Weigand | ................. F16N 25/04 184/105.1 |
| 2004/0129500 | A1 * | 7/2004 | Weigand | ................. F16N 25/04 184/105.1 |
| 2007/0209879 | A1 | 9/2007 | Schmidt et al. | |

FOREIGN PATENT DOCUMENTS

| | | |
|---|---|---|
| DE | 36 12 832 A1 | 10/1987 |
| DE | 41 10 893 A1 | 10/1992 |
| DE | 103 41 880 A1 | 4/2005 |
| DE | 10 2004 016 005 A1 | 10/2005 |
| EP | 0 507 342 A | 7/1992 |
| EP | 0 507 342 A | 10/1992 |
| EP | 0 507 342 A1 | 10/1992 |
| EP | 1 209 038 A1 | 5/2002 |
| EP | 1 209 038 B1 | 4/2004 |
| EP | 1514774 A1 * | 3/2005 ......... B62D 53/0885 |
| EP | 1514774 A1 * | 3/2005 ......... B62D 53/0885 |
| FR | 2 555 110 A | 5/1985 |
| FR | 2 555 110 A1 | 5/1985 |
| JP | 61-034606 | 9/1987 |

OTHER PUBLICATIONS

Machine Translation of FR 2555110; retreived Dec. 28, 2014.*
Machine Translation of EP 1209038; retreived Dec. 28, 2014.*
International Preliminary Examination Report, Priority Appln. PCT/EP2006/001269, Jan. 24, 2008 (8 pages).
Canadian Office Action in Canadian Counterpart Appln. No. 2,598,399, dated Oct. 5, 2009 (3 pages).
First Chinese Office Action in Chinese Counterpart Appln. No. 20068000446.5, dated Feb. 12, 2010 (8 pages).
Second Chinese Office Action in Chinese Counterpart Appln. No. 20068000446.5 dated Jun. 15, 2011 (3 pages).
First European Office Action in EP Counterpart Appln. No. 06706881.7, dated Jan. 8, 2008 (2 pages).
Second European Office Action in EP Counterpart Appln. No. 06706881.7, dated Jun. 5, 2008 (7 pages).
Indian Office Action in counterpart Indian Appln. No. 6380/DELNP/2007, dated Nov. 24, 2014 (2 pages).
First Japanese Office Action in Japanese Counterpart Appln. No. 2007-554512, dated Jan. 19, 2010 (7 pages).
Second Japanese Office Action in Japanese Counterpart Appln. No. 2007-554512,dated Jan. 4, 2011 (3 pages).
Third Japanese Office Action in Japanese Counterpart Appln. No. 2007-554512,dated Nov. 1, 2011 (5 pages).
Fourth Japanese Office Action in Japanese Counterpart Appln. No. 2007-554512,dated Jul. 31, 2012 (6 pages).

* cited by examiner

LUBRICATING SYSTEM FOR A FIFTH WHEEL TRACTION COUPLING OF A SEMI TRAILER TRACTION ENGINE

BACKGROUND OF THE INVENTION

Field of the Invention

The invention concerns a lubrication system for a fifth wheel traction coupling of a towing vehicle, comprising a coupling plate with at least one grease discharge aperture on the upper side, connected through a supply line, which is mounted stationary on the coupling plate, to a lubrication device.

Description of Related Art

Fifth wheel traction couplings are usually mounted on semi-trailer traction engines and provide the connection between the coupling plate and the kingpin of a semi trailer in a coupled state. After coupling the semi trailer, the locking mechanism of the fifth wheel traction coupling is brought from a receiving opened position to a locked position with either an operating handle, mounted above the fifth wheel traction coupling or a remote controlled drive from inside the cabin of the towing vehicle. Generally, a locking hook, which is included in the locking mechanism, at least partially encloses the kingpin that is engaged into the fifth wheel traction coupling. During the drive, a relative movement occurs between the upper side of the coupling plate and a bearing surface on the bottom side of the semi trailer as well as between the components of the locking mechanism and the kingpin. The relative movement results from the steering movements of the towing vehicle compared to the semi trailer. This mechanical stress is additionally intensified by corrosive factors, caused by contact with diesel fuel, for instance, and an inevitable sand entry.

To keep the material wear as low as possible, the upper side of the coupling plate must be lubricated regularly. This lubricating is carried out automatically on semi-trailer traction engines with a centralized lubrication system. Usually, an additional supply line is connected from the centralized lubrication system to the grease discharge apertures on the surface of the coupling plate as well as the lubrication holes of the kingpin. Nevertheless, because of maintenance free bearings in modern semi-trailer traction engines, a lubrication necessity through a centralized lubrication system becomes increasingly redundant, so that installing a centralized lubrication system is either refrained from and the coupling plate lubricated by hand, or an expensive centralized lubrication system is exclusively installed to lubricate the fifth wheel traction coupling of the towing vehicle.

BRIEF SUMMARY OF THE INVENTION

Starting from this situation, the basis of this invention is the task of developing a lubricating system for semi-trailer traction engines that enables automated lubrication, regardless of the availability of a centralized lubrication system.

The task is solved according to the invention, with a lubricating system where the lubrication device is assigned to the fifth wheel traction coupling and is mounted directly on the fifth wheel traction coupling or in proximity to the fifth wheel traction coupling.

With the term "directly", it is understood that the mounting of the lubricating device is made on components of the fifth wheel traction coupling as for example, the coupling plate, bearing brackets, bearing plates or structural crossheads. Alternatively, the lubricating device can also be mounted in proximity to the fifth wheel traction coupling. With this proximity, is intended an adjacent chassis component to the fifth wheel traction coupling. Because exclusively for the components of the fifth wheel traction coupling that are to be lubricated, the lubricating system is independent from the technical equipment of the semi-trailer traction engine or the application profile of the semi-trailer, as for example, the frequency of changing the semi trailer and the state of the upper side of the coupling plate, resulting from those changes. With few semi trailer changes, this can be a largely maintenance-free plastic lining or with frequent semi trailer changes, a sheet metal or cast metal surface.

In a preferred design, the lubricating device is mounted underneath the coupling plate. In the majority of cases, an empty installation space exists in this area, between the protuberant reinforcement ribs, to safely accommodate the lubricating device. This has the advantage that the lubricating device turns with the moving coupling plate and therefore, no flexible lines are used, which are relatively susceptible to failure.

Favorably, the lubricating device comprises a grease container and a feed pump. The annual grease consumption of the fifth wheel traction coupling ranges from approximately 1 to 1.2 $dm^3$, so the grease container should have a volume of at least 0.75 $dm^3$, preferably 1.0 $dm^3$. In dependency of the pressure in the supply line or lines, the feed pump can thereby operate intermittently and provide an output of grease from the grease discharge apertures.

In practical operations, it is of an advantage, if the grease container has a level indicator, so that an almost empty grease container can be detected in time. The level indicator should be installed in the driver's cabin of the towing vehicle in the field of vision of the driver or at a place in the vehicle, that the driver can oversee without difficulties. The grease container can be filled either in the installed condition, from the outside, or changed as a cartridge. The feed pump or other components do not have to be removed.

Preferentially, the feed pump is electronically controlled, so that control programs for the lubrication can be stored there. Also, the communication with an external control device would be possible. The control device can receive signals from other sensors, which for instance detect the attachment of a semi trailer and on dependency of this data; it can start or stop the operation of the feed pump. It is also possible, to register the pivoting movement of the semi trailer compared to the towing vehicle with sensors and to initiate an output of the grease after an adjustable number of pivoting movements.

Favorably, the control device is installed at the fifth wheel traction coupling. This has also the advantage that the fifth wheel traction coupling can be configured to the whole lubrication system before its delivery and the customer can install it to the vehicle in an easy manner.

The communication between the electronics and the control device can take place wirelessly. Alternatively, the electronics can also be connected with a connector plug to the control device.

In a preferred design, the lubrication device contains a distributor. On this distributor, each supply line has its own valve, so that certain areas of the fifth wheel traction coupling or single components, like the locking hook, can be supplied selectively with an adjustable amount of grease. Another possibility to adjust the amount of grease is through the selection of the cross section of the supply lines.

Longer lines can be built with a larger cross section and shorter lines with a smaller cross section.

An exceptionally service-friendly and compact construction method can be achieved if the grease container, the feed pump and the distributor are integrated in one unit.

To use the already limited installation space efficiently, particularly underneath the coupling plate, the lubrication device should have a structural shape, which is at least partially adapted to the contouring of the fifth wheel traction coupling or the coupling plate. The optimum solution would be, if the lubrication device could be shaped according to its destined installation space. Provided that this is not possible on the basis of sealing problems of the grease container, the external shape should be at least approximated to the available installation space.

Preferentially, the lubrication device is manufactured as a plastic and/or metal component.

The locking components of the fifth wheel traction coupling can also be linked with a supply line to the lubrication device.

Provided that a coated locking hook is used on the fifth wheel traction coupling, the lubricant amount necessary for this design can clearly be reduced compared to a standard hook, which in return has a positive affect on the container size.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. The invention will be explained in the following four drawings for a better understanding. It is shown in:

FIG. 1: a bottom view of a coupling plate with lubrication device

Figure 2:
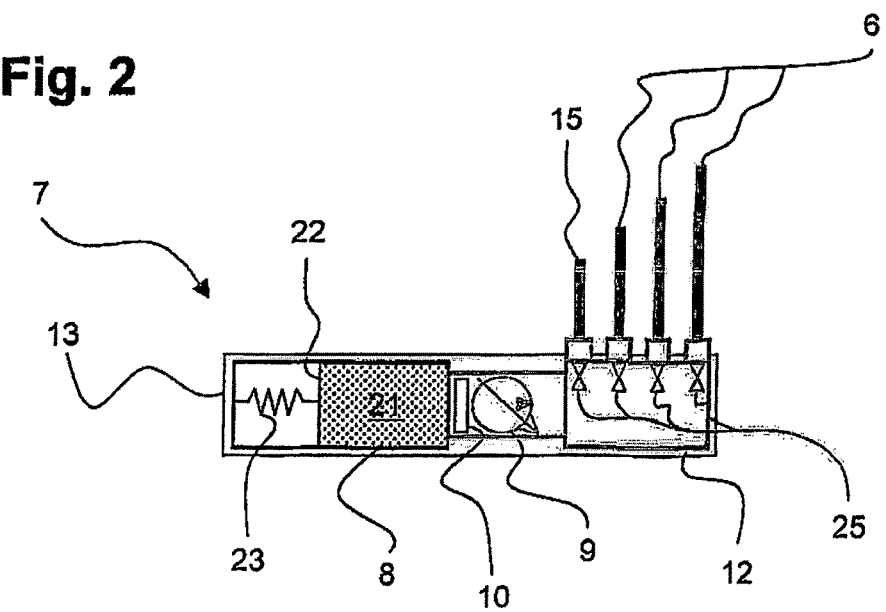
Figure 3:
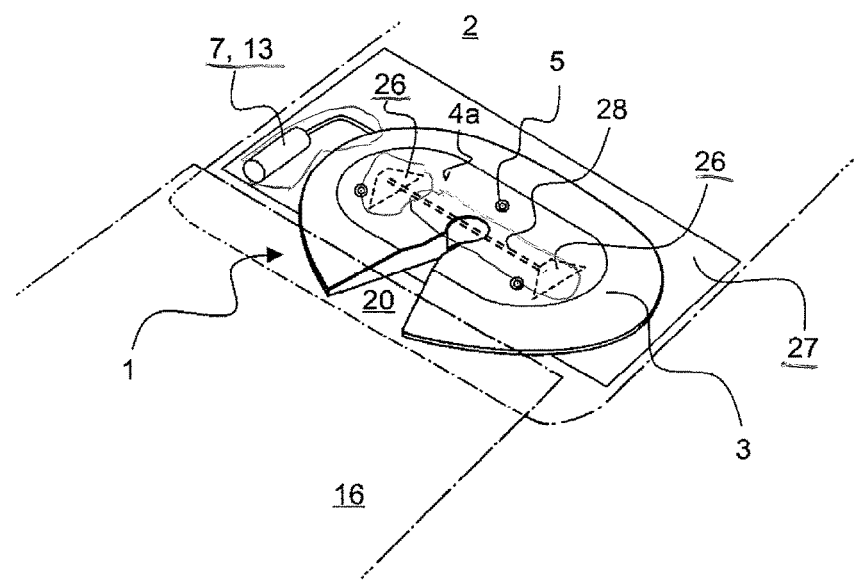
Figure 4:
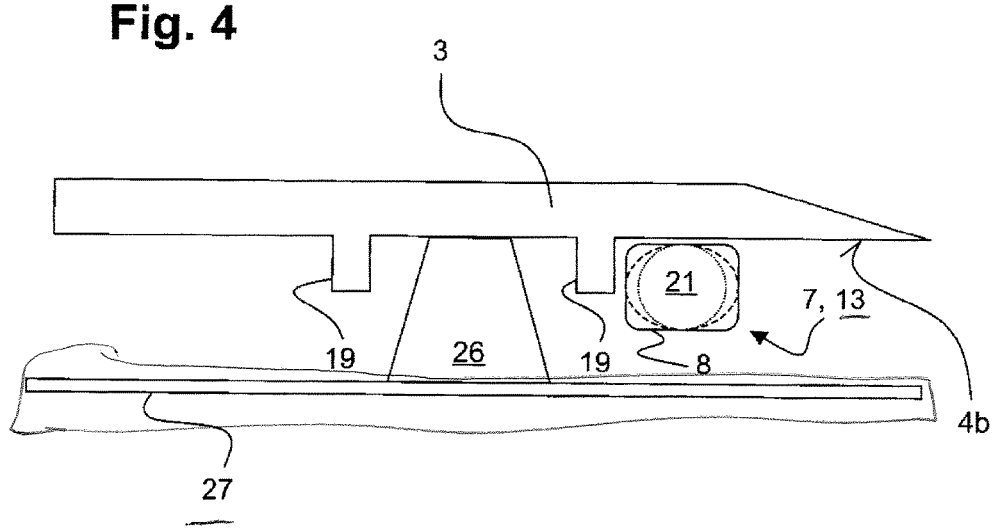

FIG. 2: an enlarged schematic display of the lubrication device;

FIG. 3: a perspective top view of a coupling plate with grease discharge apertures FIG. 4: a schematic side view of a coupling plate with various cross section geometries of the lubrication device.

Figure 5:
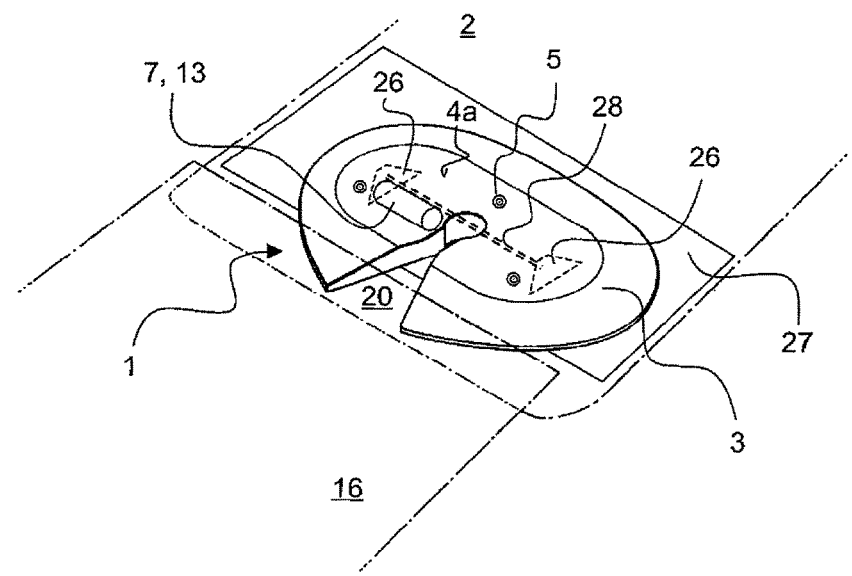
Figure 6:
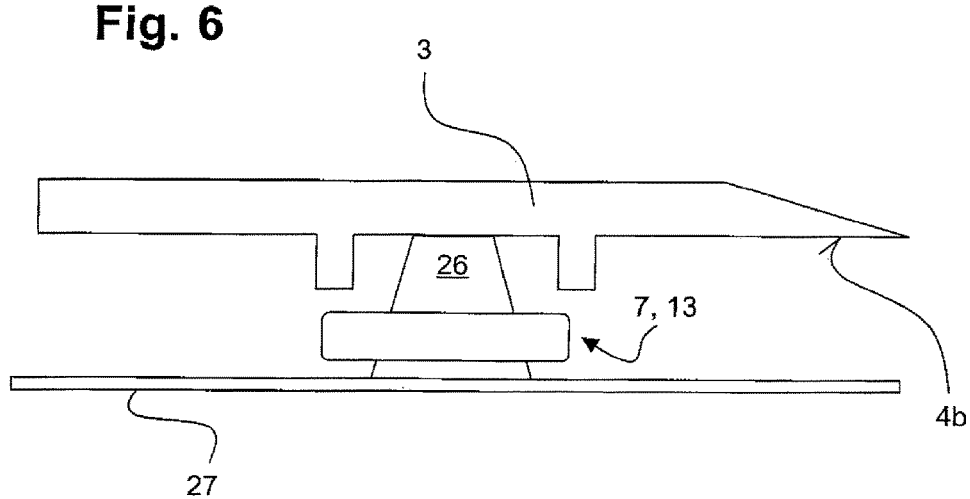

FIG. 5: a perspective top view of a lubrication device mounted to a support cross-member; and FIG. 6: a side elevational view of a lubrication device mounted to a bearing support.

DETAILED DESCRIPTION OF THE INVENTION

FIG. 1 shows, by means of a bottom view, a coupling plate 3 of a fifth wheel traction coupling 1 with the lubrication device 7 installed to the bottom side 4b. In a concentric area on the bottom side 4b of the coupling plate 3, two parallel-arranged reinforcement ribs 19 completely cross the coupling plate 3. In the middle of the coupling plate 3, between the reinforcement ribs 19, is a bearing section 24, which connects to the king pin (not shown) of a semi trailer 16 (see FIG. 3) through a receiving opening 20. After connecting to the king pin, the fifth wheel traction coupling 1 is brought from a receiving opened position to a locked position with an operating handle 18 and a locking mechanism 17. The locking mechanism 17 cooperates with a locking hook 14, covered to a large extent by the reinforcement ribs 19, which at least partially encloses the king pin (not shown) in the locked, driving position.

The lubrication device 7 is aligned in its axial extension parallel to one of the reinforcement ribs 19. Four supply lines 6, 15, which are also laid out stationary on the bottom side 4b of the coupling base, are connected to the lubrication device 7. The three supply lines 6 lead into the grease discharge apertures 5 which break through the coupling base 3 and allow a grease discharge on the upper side 4a (see FIG. 3) of the coupling base 3. The grease discharge apertures 5 are evenly distributed in a circumferential direction on the coupling base 3. FIG. 3 also illustrates the bearing supports 26, bearing plate 27 and support cross-member 28.

The single supply line 15, also connected to the lubrication device 7, serves for the lubrication of the locking hook 14. For that reason, the supply line 15 is designed as a flexible line, at least in the transitional range to the locking hook 14, to allow continuous pivoting movements of the locking hook 14.

A control device 11, also installed in proximity to one of the reinforcement ribs 19, sends signals, wirelessly, to the lubrication device 7, concerning the output of grease.

The individual structural elements of the lubrication device 7 are displayed schematically in FIG. 2. A grease container 8 contains the grease 21, which is supplied through a push piston 22 to a feed pump 9, installed to the grease container 8. The push piston 22 is pushed forward by a compression spring 23, which supplies the feed pump 9 always with a sufficient amount of grease 21. The feed pump 9 is controlled by electronics 10, which receive the signals from the control device 11, visible in FIG. 1. The elements, grease container 8, feed pump 9 and distributor 12 are compactly accommodated in a common housing 13.

From the feed pump 9, the grease 21 reaches the distributor 12, and to the distributor outlets are connected the supply lines 6, 15. The distributor 12 contains mainly the control valves 25, with which it is possible to selectively load the grease discharge apertures 5 and/or the locking hook 14 (see FIG. 1).

FIG. 3 shows the positioning of the coupling plate 3 on a towing vehicle 2, whereby the semi trailer 16 already partly overlaps the coupling plate 3 during coupling. On the upper side 4a of the coupling plate 3, in total, three grease discharge apertures 5 can be identified. The supply lines 6, 15 and the lubrication device 7 are underneath the coupling plate 3 and are therefore not visible.

FIG. 4 schematically displays a coupling plate 3, on whose bottom side 4b two reinforcement ribs 19 stick out. Due to the limited available installation space underneath the coupling plate 3 and the requirement to hold a large quantity of grease 21 ready, in order to timely maximize the intervals for the refill of grease 21, the grease container 8 can also be designed with a cross section that is close to being elliptical or square. An angular cross-section shape however, leads increasingly to sealing problems of the push piston 22 (see FIG. 2). With an angular cross-section shape for example, the grease container 8 and/or the lubrication device 7 fit better to already existing shapes of the coupling plate 3, such as the reinforcement ribs 19, and thereby enable the storage of a large quantity of grease 21.

REFERENCE LIST

1 Fifth Wheel Traction Coupling
2 Towing vehicle

3 Coupling Plate
4a Upper side Coupling Plate
4b Bottom Side Coupling Plate
5 Grease Discharge Aperture
6 Supply Line
7 Lubrication Device
8 Grease Container
9 Feed Pump
10 Electronics
11 Control Device
12 Distributor
13 Structural Unit, Housing
14 Locking Hook
15 Supply Line Locking Hook
16 Semi trailer
17 Locking Mechanism
18 Operating Handle
19 Reinforcement Rib
20 Receiving Opening
21 Grease
22 Push Piston
23 Compression Spring
24 Bearing section
25 Control valves
26 bearing supports
27 bearing plate
28 support cross-member It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A lubrication system for a fifth wheel traction coupling for a semi-trailer traction vehicle, including a coupling plate, whose upper side has at least one grease discharge aperture, which is connected to a lubrication device via a supply line which is arranged to be fixed in position to the coupling plate, wherein
    the lubrication device is associated exclusively with the fifth wheel traction coupling and the lubrication device comprises a grease container, a feed pump and a distributor, with the grease container, the feed pump and the distributor of the lubrication device being integrated in a common housing, wherein the common housing is fixed solely to a bottom side of the coupling plate of the fifth wheel traction coupling; and
    wherein the distributor is connected to the feed pump so as to receive a quantity of grease therefrom, and wherein the distributor comprises a plurality of outlets such that the quantity of grease exits the distributor via the plurality of outlets.

2. A lubrication system according to claim 1, wherein the feed pump is controlled and operated by electronics.

3. A lubrication system according to claim 2, wherein the electronics communicate with an external control device.

4. A lubrication system according to claim 3, wherein the external control device is installed to the fifth wheel traction coupling.

5. A lubrication system according to claim 3, wherein the electronics and the control device communicate wirelessly with one another.

6. A lubrication system according to claim 1, wherein the lubrication device has a design, which is at least partly adapted to the contour of the fifth wheel traction coupling.

7. A lubrication system for fifth wheel traction couplings according to claim 1, wherein the lubrication device is manufactured as a plastic and/or metal component.

8. A lubrication system for fifth wheel traction couplings according to claim 1, wherein a coated locking hook is connected to the lubrication device by a second supply line.

9. A lubrication system for fifth wheel traction couplings according to claim 1, wherein the distributor provides the supply line with a selective amount of grease.

10. A lubrication system for fifth wheel traction couplings according to claim 1, wherein there are at least two grease discharge apertures and at least two supply lines, and the feed pump is controlled and operated by electronics.

11. A lubrication system for fifth wheel traction couplings according to claim 10, wherein control programs for lubrication are stored in the electronics.

12. The lubrication system according to claim 1, wherein each of the plurality of outlets comprises a control valve thereon.

13. The lubrication system according to claim 1, wherein the grease container is configured to store a quantity of grease therein, wherein a portion of the quantity of grease is supplied to the feed pump via actuation of a piston driven by a compression spring and disposed within the grease container.

14. The lubrication system according to claim 1, wherein each of the grease discharge apertures on the coupling plate has a corresponding supply line extending from the distributor, such that grease can be simultaneously distributed through each of the supply lines.

15. A lubrication system for a fifth wheel traction coupling for a semi-trailer traction vehicle, including a coupling plate, whose upper side has at least two grease discharge apertures, which is connected to a lubrication device via supply lines which are arranged to be fixed in position to the coupling plate, wherein
    the lubrication device is associated exclusively with the fifth wheel traction coupling and the lubrication device comprises a grease container, a feed pump, and a distributor having at least two outlets, with the grease container, the feed pump and the distributor of the lubrication device being integrated in a common housing, wherein the common housing is fixed solely to a bottom side of the coupling plate of the fifth wheel traction coupling and the feed pump being controlled and operated by electronics, wherein the electronics communicate with an external control device.

16. A lubrication system for a fifth wheel traction coupling for a semi-trailer traction vehicle, including a coupling plate, whose upper side has at least two grease discharge apertures, which is connected to a lubrication device via supply lines which are arranged to be fixed in position to the coupling plate, wherein
    the lubrication device is associated exclusively with the fifth wheel traction coupling and the lubrication device comprises a grease container, a feed pump and a distributor, with the grease container, the feed pump and the distributor of the lubrication device being integrated in a common housing, wherein the common housing is fixed solely to a bottom side of the coupling plate of the fifth wheel traction coupling, and the feed pump being electronically controlled.

17. A lubrication system for a fifth wheel traction coupling according to claim 16, wherein electronics for electronic control of the feed pump store control programs for lubrication.

18. A lubrication system for a fifth wheel traction coupling for a semi-trailer traction vehicle, including a coupling plate, whose upper side has at least one grease discharge aperture, which is connected to a lubrication device via a supply line which is arranged to be fixed in position to the coupling plate, wherein the lubrication device is associated exclusively with the fifth wheel traction coupling and the lubrication device comprises a grease container, a feed pump and a distributor, with the grease container, the feed pump and the distributor of the lubrication device being fixed to a bottom side of the coupling plate of the fifth wheel traction coupling, and wherein the distributor is connected to the feed pump so as to receive a quantity of grease therefrom, and wherein the distributor comprises a plurality of outlets such that the quantity of grease exits the distributor via the plurality of outlets.

19. A lubrication system for a fifth wheel traction coupling for a semi-trailer traction vehicle, including a coupling plate, whose upper side has at least one grease discharge aperture, which is connected to a lubrication device via a supply line which is arranged to be fixed in position to the coupling plate, wherein the lubrication device is associated exclusively with the fifth wheel traction coupling and the lubrication device comprises a grease container, a feed pump and a distributor, with the grease container, the feed pump and the distributor of the lubrication device being fixed solely to a bottom side of the coupling plate of the fifth wheel traction coupling, wherein the lubrication device is aligned in its axial extension parallel to one reinforcement rib projecting from the bottom side of the coupling plate.

20. The lubrication system for a fifth wheel traction coupling for a semi-trailer traction vehicle according to claim 15, wherein the upper side has a plurality of the grease discharge apertures thereon, wherein each of the grease discharge apertures comprises a supply line that connects the grease discharge aperture to the lubrication device;

the lubrication device further comprises a common housing in which the grease container, the feed pump, and the distributor are positioned, wherein the feed pump is connected to the grease container, such that a quantity of grease stored within the grease container is supplied to the feed pump via actuation of a piston driven by a compression spring and disposed within the grease container, and wherein the distributor comprises a plurality of outlets, each of the plurality of outlets having one of the supply lines connected thereto, and wherein the common housing is fixed to a bottom side of the coupling plate.

21. A lubrication system for a fifth wheel traction coupling for a semi-trailer traction vehicle, including a coupling plate, whose upper side has at least one grease discharge aperture, which is connected to a lubrication device via a supply line which is arranged to be fixed in position to the coupling plate, wherein the lubrication device is associated exclusively with the fifth wheel traction coupling and the lubrication device comprises a grease container, a feed pump and a distributor, with the grease container, the feed pump and the distributor of the lubrication device being fixed solely to a bottom side of the coupling plate so that the grease container, the feed pump and the distributor turn together with the coupling plate.

22. A lubrication system for a fifth wheel traction coupling for a semi-trailer traction vehicle, including a coupling plate, whose upper side has at least one grease discharge apertures, which is connected to a lubrication device via supply lines which are arranged to be fixed in position to the coupling plate, wherein the lubrication device is associated exclusively with the fifth wheel traction coupling and the lubrication device comprises a grease container, a feed pump and a distributor, with the grease container, the feed pump and the distributor of the lubrication device being fixed solely to a bottom side of the coupling plate, and wherein the distributor is connected to the feed pump so as to receive a quantity of grease therefrom, and wherein the distributor comprises a plurality of outlets such that the quantity of grease exits the distributor via the plurality of outlets.

23. A lubrication system for a fifth wheel traction coupling for a semi-trailer traction vehicle, including a coupling plate, whose upper side has at least one grease discharge aperture, which is connected to a lubrication device via a supply line which is arranged to be fixed in position to the coupling plate, wherein the lubrication device is associated exclusively with the fifth wheel traction coupling and the lubrication device comprises a grease container, a feed pump and a distributor, with the grease container, the feed pump and the distributor of the lubrication device being fixed solely between a pair of protruding reinforcement ribs located on a bottom side of the coupling plate of the fifth wheel traction coupling in such way that the grease container, the feed pump and the distributor turn together with the coupling plate.

* * * * *